United States Patent Office 3,595,910
Patented July 27, 1971

3,595,910
PRODUCTION OF UNSATURATED ALIPHATIC CARBOXYLIC ACIDS
William John Ball, Capel, near Dorking, England, assignor to BP Chemicals (U.K.) Limited, London, England
No Drawing. Filed Apr. 21, 1967, Ser. No. 632,549
Claims priority, application Great Britain, May 4, 1966, 19,612/66
Int. Cl. C07c 57/04
U.S. Cl. 260—530            11 Claims

ABSTRACT OF THE DISCLOSURE

Vapour phase catalytic oxidation of (meth) acrolein using an oxide composition containing antimony, molybdenum and cobalt as catalyst.

---

The present invention relates to the production of unsaturated aliphatic carboxylic acids and in particular to the production of acrylic and methacrylic acid.

Processes for the production of unsaturated carboxylic acids e.g. acrylic and methacrylic acid, are known. Thus our British patent, Ser. No. 924,532, describes a vapour phase oxidation of acrolein or methacrolein to produce acrylic or methacrylic acid respectively comprising cobalt molybdate together with a minor proportion of one or more of the molybdates of manganese, chromium, cadmium, tin, antimony, uranium, aluminium, thorium or zirconium.

It has now been found that the use of an oxide composition containing molybdenum, antimony and cobalt oxides, with antimony in major proportion with respect to the molybdenum and cobalt combined is advantageous in the process for the production of the acrylic or methacrylic acid.

Accordingly, the present invention is a process for the production of acrylic or methacrylic acid which comprises reacting at an elevated temperature in the vapour phase acrolein or methacrolein or substances which under the reaction conditions give rise to acrolein or methacrolein with molecular oxygen over an oxide composition containing antimony, molybdenum and cobalt with antimony in major proportion with respect to the molybdenum and cobalt combined.

Substances which give rise to acrolein or methacrolein under the reaction conditions may be for example propylene giving rise to acrolein and isobutene giving rise to methacrolein.

The oxide composition must contain antimony, molybdenum and cobalt. Preferred compositions contain more than 50 atom percent and preferably between 50 and 75 atom percent of antimony, less than 30 atom percent and preferably between 1 and 30 atom percent of molybdenum and less than 40 atom percent and preferably between 5 and 40 atom percent of cobalt, based on the total metals of the composition.

The catalysts may contain the separate metal oxides and/or compounds of oxygen with two or more metals.

The catalyst may be prepared in various ways, for instance, by precipitation from a mixed aqueous solution of the soluble salts of the metals by the addition of, for example, ammonia or from the oxides, carbonates, hydroxides or hydrated oxides and ammonium molybdate or molybdic acid by suitable admixture followed if necessary by thermal decomposition of these compounds to produce the corresponding oxides in situ. Alternatively, cobalt antimonate may be first prepared by co-precipitation of cobalt and antimony oxides (or hydrated oxide) and ammonium molybdate or molybdic acid added thereafter.

By whichever method the catalyst is prepared it is preferred to subject it to a heat treatment. Preferably this heat treatment is carried out by heating the composition in a molecular oxygen containing gas e.g. air at temperatures in the range 650–950° C. Optionally, the composition containing the antimony and cobalt components may first be heat-treated in the absence of the molybdenum component in a molecular oxygen-containing gas e.g. air at temperatures in the range 600 to 950° C., the molybdenum component added thereafter and the final composition heated in a molecular oxygen containing gas e.g. air at temperatures in the range 600 to 900° C. A single heat treatment of the composition containing all components at a temperature within the range 600 to 950° C. is also envisaged.

The oxide composition catalysts may if desired be deposited upon supports such as alumina, pumice, silica or titania.

The reaction of acrolein or methacrolein, with molecular oxygen over the oxide composition catalysts may be carried out in any suitable manner, for instance as a fixed bed process in which the catalyst is used in the form of granules or pellets, or a single or multistage fluidised bed process, or as a moving bed process.

The proportion of acrolein or methacrolein in the feed to the reaction may vary within fairly wide limits, for example between 1 and 20% of the feed, and suitably between 2 and 10% by volume.

The concentration of oxygen in the feed may also vary within moderately wide limits for example between 1 and 20% by volume and preferably between 2 and 15% by volume. The oxygen may be diluted with inert gases and may be for example supplied as air.

It is preferred to carry out the reaction in the presence of a gas which is substantially inert under the conditions of reaction for example nitrogen, propane, butane, isobutane, carbon dioxide and/or steam. It is preferred to use steam or nitrogen or mixtures thereof. The concentration of the steam may vary within wide limits for example between 10 and 60% by volume of the feed.

The reaction is carried out at an elevated temperature, for instance between 250 and 550° C. and preferably between 300 and 500° C. The reaction may also be carried out under pressure for example pressures of from 0.5 to 5 atmospheres absolute. The contact time may be for example in the range ½ to 30 seconds and preferably between 1 and 5 seconds.

The acrylic or methacrylic acid may be recovered from the reaction product by any conventional method, for example, by condensation or extraction with water.

The process of the invention is further illustrated by the following examples:

EXAMPLE 1

Antimony:cobalt:molybdenum (4:1:0.5) catalyst

Antimony pentachloride (299.1 parts by weight) was added slowly to a stirred solution of cobaltous chloride hexahydrate (85 parts by weight) in 1,000 parts by weight of water. The maximum temperature recorded during this addition was 35° C.

This mixture was then neutralised to pH 7.0, by the dropwise addition of aqueous ammonia. The maximum temperature recorded during this neutralisation was 40° C. The mixture was then filtered, and the solid washed three times, each time resuspending it in water (1,000 parts by weight) and stirring for 15 minutes. The mixture was filtered and the filter-cake dried at 110° C. for 16 hours. The dried filter cake was then mixed with a solution of ammonium molybdate (22.1 parts by weight) and water (150 parts by weight), evaporated to a thick paste on a steam bath and dried for 16 hours at 110° C. The dried cake was broken down to pass 30 mesh (B.S.S.), mixed with graphite (1% by weight), pelleted and heated in air in a muffle furnace. The furnace temperature was programmed from 200° C. to 700° C. at 21° C./hour and maintained at 700° C. for 16 hours.

A gaseous mixture of (by volume) 7% acrolein, 10% oxygen, 53% nitrogen, 30% steam was passed over the catalyst in a reactor maintained at 367° C., the contact time being 3 seconds.

Of the total acrolein fed to the reactor, 75.8% was converted to acrylic acid, 8.2% to carbon oxides and 8.4% was recovered unchanged.

EXAMPLE 2

Antimony:cobalt:molybdenum (4:1:0.5) catalyst

Antimony pentachloride (299 parts by weight) was dissolved in hydrochloric acid, s.g. 1.18 (94 parts by weight) and water (320 parts by weight) and the whole brought to pH 7 by the addition of aqueous ammonia. The mixture was filtered and the filter-cake washed three times by resuspension in water (total 3000 parts by weight) and dried at 110° C.

The antimony oxides thus prepared was suspended in a solution of cobalt nitrate hexahydrate (72.8 parts by weight) in water (500 parts by weight), and aqueous ammonia was added to bring the pH to 8. The mixture was filtered and the filter-cake washed three times by resuspension in water (total 1500 parts by weight). The final filter-cake was slurried with ammonium molybdate $$(NH_4)_6Mo_7O_{24} \cdot 4H_2O$$

(22.1 parts by weight) and water (150 parts by weight) and the mixture evaporated to a paste on a steam-bath. The paste was dried at 110° C., broken down to pass 30 mesh (B.S.S.), mixed with graphite (1% by weight), pelleted and heated in a muffle furnace. The furnace temperature programmed from 200° C. to 700° C. at 21° C./hour and maintained at 700° C. for 16 hours.

A gaseous mixture of (by volume) 7% acrolein, 10% oxygen, 53% nitrogen and 30% steam was passed over the catalyst at 367° C., and 3 seconds contact time (calculated at N.T.P.). Of the total acrolein fed to the reactor 75% was converted to acrylic acid, 7% was converted to carbon oxides and 14% was recovered unchanged.

EXAMPLE 3

Antimony:cobalt:molybdenum (4:1:0.5) catalyst

Antimony pentachloride (299 parts by weight) was added slowly to a stirred solution of cobalt chloride hexahydrate (59.5 parts by weight) in water (750 parts by weight). The mixture was brought to pH 7 by the addition of aqueous ammonia, filtered and the filter-cake washed three times by resuspension in water (total 3000 parts by weight). The final filter-cake was slurried with molybdic acid, $H_2MoO_4H_2O$ (23 parts by weight) and water (140 parts by weight) and stirred for one hour. The mixture was filtered and the filter-cake dried at 110° C., broken down to pass 30 mesh (B.B.S.), mixed with graphite (1% by weight), pelleted and heated in a muffle furnace. The furnace temperature was programmed from 200° C. to 700° C. at 21° C./hour and maintained at 700° C. for 16 hours.

A gaseous mixture of (by volume) 7% acrolein, 10% oxygen, 53% nitrogen and 30% steam was passed over the catalyst in a reactor at 376° C., and 3 seconds contact time (NTP). Of the total acrolein fed to the reactor 68% was converted to acrylic acid, 14% was converted to carbon oxides and 10% was recovered unchanged.

EXAMPLE 4

Antimony:cobalt:molybdenum (4:1:0.5) catalyst added slowly to a stirred solution of cobalt chloride hexahydrate (119 parts by weight) and ammonium molybdate, $(NH_4)_6Mo_7O_{24} \cdot 4H_2O$ (44 parts by weight) in hydrochloric acid, S.G. 1.18 (118 parts by weight) and water (1500 parts by weight). The mixture was brought to pH 7 by the addition of aqueous ammonia, filtered and the solid washed three times by resuspension in water (total 3000 parts by weight). The final filter-cake was dried at 110° C., broken down to pass 30 mesh (B.S.S.), mixed with graphite (1% by weight), pelleted and heated in a muffle furnace. The furnace temperature was programmed from 200° C. to 700° C. at 21° C./hour and maintained at 700° C. for 16 hours.

A gaseous mixture of (by volume) 7% acrolein, 10% oxygen, 53% nitrogen and 30% steam was passed over the catalyst at 367° C. and 3 seconds contact time. Of the total acrolein fed to the reactor 68% was converted to acrylic acid, 17% was converted to carbon oxides and 7% was recovered unchanged.

EXAMPLE 5

Antimony:cobalt:molybdenum (4:1:0.25) catalyst

Antimony trioxide (291.5 parts by weight), was suspended in a mixture of water (390 parts by weight) and concentrated 70% nitric acid (554 parts by weight) and the whole stirred at 80–90° C. for 2 hours, cooled to 40° C., filtered and the filter-cake washed three times by resuspension in water (1200 parts by weight) and filtered. The filter-cake was dried at 110° C. for 16 hours, ground to pass 30 mesh, suspended in a solution of cobaltous nitrate hexayhdrate (145.6 parts by weight) in water (900 parts by weight) at 60° C. and neutralised to pH 8.0 by the addition of aqueous ammonia. It was then cooled to 40° C., filtered and the filter-cake washed three times by resuspension in water (700 parts by weight) and filtered. The cake was then mixed with a solution of ammonium molybdate, $(NH_4)_6Mo_7O_{24} \cdot 4H_2O$ (22.1 parts by weight) in water (200 parts by weight), evaporated to a thick paste on a steam bath and dried at 110° C. for 16 hours. It was then broken down to pass 30 mesh (B.S.S.), mixed with 1% by weight of graphite, pelleted and heated in air in a muffle furnace. The furnace temperature was programmed from 200° C. to 700° C. at 22° C./hour and maintained at 700° C. for 16 hours.

A gaseous mixture of (by volume) 7% acrolein, 53% nitrogen, 10% oxygen and 30% steam was passed over the catalyst at 371° C., and 3 seconds contact time. Of the total acrolein fed to the reactor, 67% was converted to acrylic acid, 9% was converted to carbon oxides and 18% was recovered unchanged.

EXAMPLE 6

Antimony:cobalt:molybdenum (4:2:0.5) catalyst

Antimony pentachloride (299 parts by weight) was added slowly to a solution of cobalt chloride (119 parts by weight) in water (300 parts by weight). The mixture was brought to pH 7.5 by the addition of aqueous ammonia, filtered and the filter-cake washed three times by resuspension in water (total 2000 parts by weight). The final filter-cake was suspended in a solution of ammonium molybdate $(NH_4)_6Mo_7O_{24} \cdot 4H_2O$ (22 parts by weight) in water (150 parts by weight) and evaporated to a paste on a steam bath. The paste was dried at 110° C., broken down to pass 30 mesh (B.B.S.), mixed with graphite (1% by weight), pelleted and heated in a muffle furnace. The temperature of the furance was programmed from 200° C. to 700° C. at 21° C./hour and maintained at 700° C. for 16 hours.

A gaseous mixture of (by volume) 7% acrolein, 5% oxygen, 58 nitrogen and 30% steam was passed over the catalyst at 351° C. and 3 seconds contact time. Of the total acrolein fed, 69% converted to acrylic acid, 9% was converted to carbon oxides and 14% was recovered unchanged.

EXAMPLE 7

Antimony:cobalt:molybdenum (8:1:1) catalyst

Antimony pentachloride (299 parts by weight) was added to a solution of cobaltous chloride hexahydrate (29.8 parts by weight) in water (75 parts by weight) at such a rate that the temperature did not exceed 40° C., and the whole neutralised to pH 7.0 by the addition of aqueous ammonia. During the neutralisation, the temperature did not exceed 50° C. The mixture was then cooled to 35° C., filtered and the filter-cake washed three times by resuspension in water (250 parts by weight), at room temperature, stirring for 15 minutes during each wash. The washed filter-cake was slurried with a solution of ammonium molybdate $(NH_4)_6Mo_7O_{24} \cdot 4H_2O$ (22.1 parts by weight) in water (100 parts by weight) and evaporated to a thick paste on a steam bath. It was then dried at 110° C. for 16 hours, broken down to pass 30 mesh (B.S.S.), mixed with graphite (1% by weight), pelleted and heated in air in a muffle furnace. The furnace temperature was programmed from 200° C. to 700° C. at 22° C./hour and maintained at 700° C. for 16 hours.

A gaseous mixture of (by volume) 7.0% acrolein, 53.0% nitrogen, 10.0% oxygen, 30.0% steam was passed over the catalyst in a reactor maintained at 365° C., the contact time being 3 seconds.

Of the total acrolein fed to the reactor, 74% was converted to acrylic acid, 7% to carbon oxides and 10% was recovered unchanged.

I claim:
1. A process for the production of an unsaturated aliphatic carboxylic acid selected from acrylic or methacrylic acid which comprises reacting at a temperature of from about 250°–550° C. and at a contact time of from ½ to 30 seconds in the vapor phase an unsaturated aliphatic aldehyde selected from acrolein or methacrolein or a substance which under the reaction conditions gives rise to such unsaturated aliphatic aldehyde with molecular oxygen over a catalyst composition consisting essentially of antimony, molybdenum, cobalt, and oxygen with antimony in major proportion with respect to the molybdenum and cobalt combined.

2. A process as claimed in claim 1 wherein the oxide composition contains more than 50 atom percent of antimony, less than 30 atom percent of molybdenum and less than 40 atom percent of cobalt based on the total metals of the composition.

3. A process as claimed in claim 2 wherein the oxide composition contains between 50 and 75 atom percent of antimony, between 1 and 30 atom percent of molybdenum and between 5 and 40 atom percent of cobalt.

4. A process as claimed in claim 1 wherein the oxide composition is prepared by precipitation from an aqueous solution containing a mixture of the soluble salts of the metals.

5. A process as claimed in claim 4 wherein precipitation is effected by addition of ammonia to the aqueous solution.

6. A process as claimed in claim 1 wherein the oxide composition is prepared by admixture of the oxides.

7. A process as claimed in claim 6 wherein the metal oxides are prepared in situ by mixing a substance selected from the group consisting of the carbonate, hydroxide or hydrated oxides of the metals with ammonium molybdate or molybdic acid followed by thermal decomposition.

8. A process as claimed in claim 1 in which the catalyst composition is subjected to a single heat-treatment within the range 600 to 950° C.

9. A process as claimed in claim 1 wherein the oxide composition is deposited upon a support.

10. A process as claimed in claim 9 wherein the support is alumina, pumice, silica or titania.

11. A process as claimed in claim 1 wherein propylene is the substance giving rise to acrolein and isobutene the substance giving rise to methacrolein under the reaction conditions.

References Cited

UNITED STATES PATENTS

| | | | |
|---|---|---|---|
| 3,409,665 | 11/1968 | Brown et al. | 260—530U |
| 3,260,682 | 7/1966 | Calvin et al. | 260—530U |
| 3,280,182 | 10/1966 | Gasson | 260—530U |

FOREIGN PATENTS

| | | | |
|---|---|---|---|
| 953,762 | 4/1964 | Great Britain | 260—530U |
| 903,034 | 8/1962 | Great Britain | 260—533U |

JAMES A. PATTEN, Primary Examiner

R. D. KELLY, Assistant Examiner

PO-1050
(5/69)

UNITED STATES PATENT OFFICE
CERTIFICATE OF CORRECTION

Patent No. 3,595,910          Dated July 27, 1971

Inventor(s) WILLIAM JOHN BALL

It is certified that error appears in the above-identified patent and that said Letters Patent are hereby corrected as shown below:

Col. 3, l. 58, "B.B.S." should read --B.S.S.--

Col. 3, l. 72, the following should be added before the word "added" at l. 73.
--Antimony pentachloride (598 parts by weight) was--

Col. 4, l. 64, "B.B.S." should read -B.S.S.--

Col. 4, l. 71, add a percent sign (%) after "58" and before "nitrogen"

Signed and sealed this 7th day of March 1972.

(SEAL)
Attest:

EDWARD M. FLETCHER, JR.
Attesting Officer

ROBERT GOTTSCHALK
Commissioner of Patents